(12) United States Patent
Szasz et al.

(10) Patent No.: US 11,069,134 B2
(45) Date of Patent: Jul. 20, 2021

(54) METHODS, DEVICES AND COMPUTER PROGRAM PRODUCTS FOR GENERATION OF MESH IN CONSTRUCTED 3D IMAGES CONTAINING INCOMPLETE INFORMATION

(71) Applicant: SONY CORPORATION, Tokyo (JP)

(72) Inventors: Pal Szasz, Lund (SE); Johannes Elg, Helsingborg (SE); Fredrik Olofsson, Lund (SE); Lars Novak, Bjärred (SE); Fredrik Mattisson, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/641,363

(22) PCT Filed: Aug. 31, 2017

(86) PCT No.: PCT/US2017/049550
§ 371 (c)(1),
(2) Date: Feb. 24, 2020

(87) PCT Pub. No.: WO2019/045717
PCT Pub. Date: Mar. 7, 2019

(65) Prior Publication Data
US 2020/0226829 A1    Jul. 16, 2020

(51) Int. Cl.
*G06T 17/20* (2006.01)
*G06T 19/20* (2011.01)

(52) U.S. Cl.
CPC .............. *G06T 17/20* (2013.01); *G06T 19/20* (2013.01); *G06T 2219/2021* (2013.01)

(58) Field of Classification Search
None
See application file for complete search history.

(56) References Cited

U.S. PATENT DOCUMENTS

2003/0091227 A1* 5/2003 Chang .................... G06T 17/10
382/154
2012/0113116 A1    5/2012 Luisi et al.

FOREIGN PATENT DOCUMENTS

WO        2014106760       7/2014

OTHER PUBLICATIONS

Turk et al., Zippered Polygon Meshes from Range Images, SIGGRAPH '94, Jul. 24-29, Orlando, Florida, 8 pages. (Year: 1994).*

(Continued)

*Primary Examiner* — Haixia Du
(74) *Attorney, Agent, or Firm* — Myers Bigel, P.A.

(57) ABSTRACT

Methods, systems, and computer program products for removing unused portions of a 3D mesh representation of an object may include generating a first mesh representation of the object, the first mesh representation including a plurality of polygons, respective ones of the polygons including at least three vertices and at least three edges, wherein respective ones of the plurality of polygons are associated with a precision value that indicates an extent to which the respective ones of the plurality of polygons in the first mesh representation match the object, and adjusting the first mesh representation of the object to create a second mesh representation of the object by removing, front the first mesh representation, polygons of the plurality of polygons that are associated with precision values that have not been modified from an initial precision value.

20 Claims, 13 Drawing Sheets

(56) References Cited

OTHER PUBLICATIONS

Kolja Kähler et al., "Head Shop: Generating animated head models with anatomical structure", ACM Siggraph Symposium on Computer Animation, San Antonio, TX, Jul. 21-22, 2002; [ACM Siggraph Symposium on Computer Animation, ACM, New York, NY, Jul. 21, 2002 (Jul. 21, 2002), pp. 55-63, XP058171515, DOI: 10.1145/545261.545271, ISBN: 978-1-58113-573-2.
PCT International Search Report and Written Opinion of the International Searching Authority dated Mar. 19, 2018 for corresponding PCT International Application No. PCT/US2017/049550.
Knopf et al. "Deformable mesh for virtual shape sculpting", Robotics and Computer-Integrated Manufacturing, 21 (2005), pp. 302-311.
Communication Pursuant to Article 94(3) EPC, dated Apr. 22, 2021, for corresponding European Application No. 17765342.5.

* cited by examiner

METHODS, DEVICES AND COMPUTER PROGRAM PRODUCTS FOR GENERATION OF MESH IN CONSTRUCTED 3D IMAGES CONTAINING INCOMPLETE INFORMATION

CROSS REFERENCE TO RELATED APPLICATION

This application is a 35 U.S.C. § 371 national stage application of PCT International Application No. PCT/US2017/049550, filed on Aug. 31, 2017, the content of which is incorporated herein by reference in its entirety. The above-referenced PCT International Application was published in the English language as International Publication No. WO 2019/045717 A1 on Mar. 7, 2019.

FIELD

Various embodiments described herein relate to methods and devices for image processing and, more particularly, to creating 3D images.

BACKGROUND

There are multiple environments in which three-dimensional (3D) models of real physical objects may be useful. For example, 3D printing may make allow the generation of a model of an object based on a generated 3D representation of the object. As another example, immersive computing environments may use 3D models to represent and/or display real objects in a 3D virtual space. Generating a 3D model of a physical object may involve using a camera to record images of the physical, object, and mapping a shape and surface of the object in virtual space. One such method to map the object to virtual space is a technique known as Simultaneous localization and Mapping (SLAM).

SLAM relates to the process of constructing or updating a map of an object while a user's location is non-static in the environment. In mono-camera systems, image-based positioning algorithms may use SLAM techniques to create 3D images for augmented reality, 3D printing, 3D model development, and other applications. An important part of using SLAM techniques is the baseline initialization of an inferred 3D image from two-dimensional (2D) coordinates. By inferring the 3D image from the 2D coordinates, SLAM techniques can generate a 3D model from a series of 2D images from a camera, which can allow the generation of a 3D model from the series of images.

Generating the 3D model of the object from the images can be a time-consuming process utilizing large amounts of computer processing power and computer resources. Often the series of 2D images may contain incomplete information about the object. For example, an object being scanned may be placed on a table or on the ground. Methods for generating the 3D model may be unable to reconstruct parts of the object without sufficient information about portions of the object that may be concealed.

SUMMARY

Various embodiments described herein provide methods, systems, and computer program products for removing unused portions of a 3D mesh representation of an object.

According to some embodiments described herein, a method includes generating a first mesh representation of die object, the first mesh representation including a plurality of polygons, respective ones of the polygons including at least three vertices and at least three edges, wherein respective ones of the plurality of polygons are associated with a precision value that indicates an extent to which the respective ones of the plurality of polygons in the first mesh representation match the object, and adjusting the first mesh representation of the object to create a second mesh representation of the object by removing, from the first mesh representation, polygons of the plurality of polygons that are associated with precision values that hove not been modified from an initial precision value. In some embodiments, the method may include storing the second mesh representation in the memory of the electronic device. In some embodiments, the method may be performed in the memory of an electronic device.

According to some embodiments described herein, an imaging system includes a processor, and a memory coupled to the processor and storing computer readable program code that when executed by foe processor causes the processor to perform operations including generating, within the memory, a first mesh representation of an object, foe first mesh representation including a plurality of polygons, respective ones of foe polygons including at least three vertices and at least three edges, respective ones of foe plurality of polygons are associated with a precision value that indicates an extent to which the respective ones of foe plurality of polygons in the first mesh representation match foe object, and adjusting the first mesh representation of the object to create a second mesh representation of foe object removing, from the first mesh representation, polygons of the plurality of polygons that are associated with precision values that have not been modified from an initial precision value. In some embodiments, the operations may include storing the second mesh representation in the memory of the electronic device.

A computer program product for operating an imaging system includes a non-transitory computer readable storage medium having computer readable program code embodied in foe medium that when executed by a processor causes the processor to perform the method embodiments described herein.

In some embodiments, generating tire first mesh representation of the object includes modifying the precision value associated with ones of the plurality of polygons responsive to repeatedly adjusting the ones of the plurality of polygons to match a surface of the object.

In some embodiments, the operations of the method, imaging system, and/or computer program product further include setting the precision value associated with each of the plurality of polygons to the initial precision value, receiving one or more images of a portion of the object, identifying a plurality of points in the one or more images that correspond to a surface of the object, associating the plurality of points with a first set of vertices of the plurality of polygons, and modifying the precision value associated with the first set of the plurality of polygons responsive to adjusting the first set of the plurality of polygons within the first mesh representation based on the associated plurality of points.

In some embodiments, the at least three vertices of respective ones of the plurality of polygons include the precision value, and respective polygons of the plurality of polygons are associated with each of the precision values of the at least three vertices of the respective polygon.

In some embodiments, removing, from the first mesh representation, polygons of the plurality of polygons associated with precision values that have not been modified from an initial precision value includes identifying a border in the first mesh representation between the vertices of the plurality of polygons whose precision values have not been modified from the initial precision value and the vertices of the plurality of polygons whose precision values have been modified from the initial precision value, establishing a three-dimensional plane through the first mesh representation based on the location of the border, and removing portions of the first mesh representation on a side of the three-dimensional plane.

In some embodiments, the three-dimensional plane through the first mesh representation at least partially intersects the border.

In some embodiments, the border includes a contiguously connected series of edges through vertices of the plurality of polygons.

In some embodiments, establishing the three-dimensional plane through the first mesh representation includes performing a random sample consensus (RANSAC) calculation on a plurality of vertices on the border.

In some embodiments, establishing the three-dimensional plane through the first mesh representation includes repeating a plurality of times the operations including randomly selecting at least three vertices from a plurality of vertices on the border, constructing a temporary plane through the at least three vertices, and calculating a cumulative distance for the vertices on the border from the temporary plane, and establishing the three-dimensional plane through the temporary plane that has the lowest calculated cumulative distance.

In some embodiments, removing portions of the first mesh representation on a side of the three-dimensional plane comprises removing portions of the first mesh representation that are at least a first distance away from the three-dimensional plane in a line normal to the three-dimensional plane.

In some embodiments, identifying the border in the first mesh representation between the vertices of the plurality of polygons whose precision values have not been modified from the initial precision value and the vertices of the plurality of polygons whose precision values have been modified from the initial precision value includes identifying a contiguously connected series of edges through vertices of the plurality of polygons, wherein each edge of the series of edges has one vertex whose precision value has been modified and one vertex whose precision value has not been modified.

In some embodiments, identifying the border in the first mesh representation between the vertices of the plurality of polygons whose precision values have not been modified from the initial precision value and the vertices of the plurality of polygons whose precision values have been modified from the initial precision value includes repeatedly examining each respective edge of the plurality of polygons to identify border edges, wherein the border edges have one vertex whose precision value has been modified and one vertex whose precision value has not been modified, and identifying a contiguously connected series of border edges within the first mesh representation as the border.

In some embodiments, the plurality of polygons comprise triangles having three vertices and three edges.

In some embodiments, the operations of the method, imaging system, and/or computer program product further include displaying the second mesh representation on a display.

Advantageously, these embodiments may quickly refine a 3D model to remove unused portion of the model. For example, these operations may not require performing calculations for unused portions of a mesh representation during subsequent processing. These operations may also reduce the size of the mesh representation, and thus reduce the amount of storage and processing operations required to manipulate the mesh representation. These operations may thus simplify and expedite the generation of a 3D model, and may reduce processing time and resources by more quickly refining the 3D model. In addition, these operations may reduce the storage required for a 3D model.

It is noted that aspects of the inventive concepts described with respect to one embodiment, may be incorporated in a different embodiment although not specifically described relative thereto. That is, all embodiments and/or features of any embodiment can be combined in any way and/or combination. Other operations according to any of the embodiments described herein may also be performed. These and other aspects of the inventive concepts are described in detail in the specification set forth below.

BRIEF DESCRIPTION OF THE DRAWINGS

The above and other objects and features will become apparent from the following description with reference to the following figures, wherein like reference numerals refer to like parts throughout the various figures unless otherwise specified.

DETAILED DESCRIPTION

Figure 1:
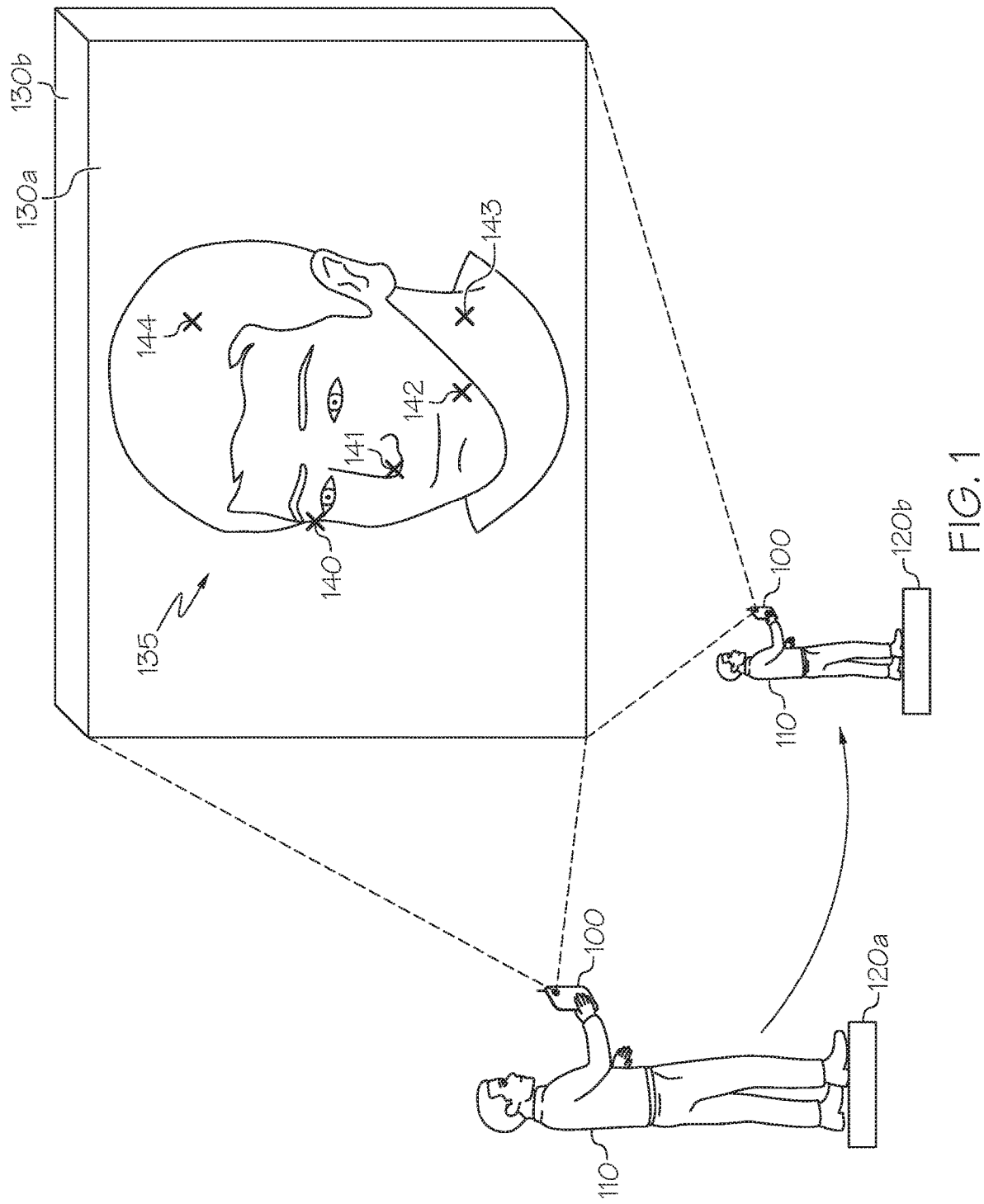
FIG. 1 illustrates a user taking pictures with a camera as part of a 3D construction of an object, according to various embodiments described herein.

Various embodiments will be described more fully hereinafter with reference to the accompanying drawings. Other embodiments may take many different forms and should not be construed as limited to the embodiments set forth herein. Like numbers refer to like elements throughout.

Applications such as 3D imaging, mapping, and navigation may use SLAM, which provides a process for constructing or updating a map of an unknown environment while simultaneously keeping track of an object's location within it. This computational problem is recognized to be a chicken-and-egg problem since the object may be moving and the environment may be changing. 2D images of real objects may be captured with the objective of creating a 3D image that is used in real-world applications such as augmented reality, 3D printing, or 3D visualization with different perspectives of the real objects. Hie generated 3D representation of the objects may be characterized by feature points that are specific locations on the physical object in the 2D images that are of importance for the 3D representation such as corners, edges, center points, and other specific areas on the physical object. There are several algorithms used for solving this computational problem associated with 3D imaging, using various approximations. Popular approximate solution methods include the particle filter and Extended Kalman Filter (EKF). The particle filter, also known as a Sequential Monte Carlo (SMC) linearizes probabilistic estimates of data points. The Extended Kalman Filter is used in non-linear state estimation in applications including navigation systems such as Global Positioning Systems (GPS), self-driving cars, unmanned aerial vehicles, autonomous underwater vehicles, planetary rovers, newly emerging domestic robots, medical devices inside the human body, and/or imaging systems, imaging systems may generate 3D representations of an object using SLAM techniques by performing a transformation of the object in a 2D image to produce a representation of a 3D object.

However, the underlying 2D images may not contain all of the information for the object being scanned. For example, a 2D image of a particular object on a table may be taken from several different angles to develop a 3D model of the object. The 2D images, however, may contain the table as part of the image and/or may not contain a full view of the table, because the images may be focused on the object. This can be problematic, since portions of the object connected to the table as well as the table itself were not scanned and, thus, cannot be reconstructed without approximation.

Moreover, methods, systems, and computer program products to construct a 3D representation of an object may include, as described herein, generation of a mesh representation approximating the surface of the object. Because portions of the object are obscured by contact with other objects, the generated mesh representation may not be fully updated, or may include the other objects (e.g., table, floor, base, etc.) that are not desired. This can lead to large 3D mesh representations in which portions of the 3D mesh representation contain little or no actual information of the object being scanned. This can result in bulky models which can be difficult to process. In addition, the processing and storage of these models may lead to a waste of computing resources and efficiency, as portions of the model are processed which, ultimately, have little or no bearing on the object being reconstructed. The present inventive concepts, as described herein, provide methods, systems, and computer program products which can improve the generation of 3D models by automatically truncating portions of the generated 3D mesh representation which contain unused portions.

Various embodiments described herein may arise from the recognition that reduction of the unused portions of the generated 3D mesh representation can improve the quality of the generated mesh representation of the object and/or reduce the time to generate the mesh representation. By identifying, and removing, unused portions of the mesh representation, the overall processing may be streamlined. Moreover, the removal of the unused portions of the mesh representation can reduce the size of the overall model, which may reduce the number of elements in the mesh representation that need to be further processed and may provide for reduced storage and processing capacity for manipulating the mesh representation.

The 2D images used in the methods, systems, and computer program products described herein may be captured with image sensors. Image sensors may be collocated with or integrated with a camera. The terms "image sensor," and "camera" will be used herein interchangeably. The camera may be implemented with integrated hardware and/or software as part of an electronic device, or as a separate device. Types of cameras may include mobile phone cameras, security cameras, wide-angle cameras, narrow-angle cameras, stereoscopic cameras and/or monoscopic cameras.

Generating a 3D mesh of a physical object may involve the use of a physical camera to capture multiple images of the physical object. For instance the camera may be rotated around the physical object being scanned. Based on the generated images, a mesh representation of the physical object may be generated. The mesh representation may be used in many different environments. For example, the model of the physical object represented by the mesh representation may be used for augmented reality environments, 3D printing, entertainment and the like.

As described herein, generating the 3D mesh may be improved by truncated portions of the mesh which are less useful. As will be described more fully herein, a 3D mesh representation of an object may be initialized to a generic shape (e.g., a sphere) that is subsequently refined based on repeatedly analyzing images of the object from different angles. The images of the object may be analyzed to detect points on the surface of the object, which may then be mapped to the surface of the 3D mesh representation by moving and/or adjusting the 3D mesh representation to more accurately model the object. As described herein, it may be possible to track and identify the portions of the mesh representation that have been adjusted. Subsequently, it may be possible to identify a border between the portions of the mesh representation that have been modified and those portions of the mesh representation have not been modified. The identified border may indicate a location at which portions of the mesh representation may be removed to truncate the mesh representation. In this way, portions of the mesh representation that have not been modified, and may not be part of the 3D model of the object, may be removed.

Figure 3A:
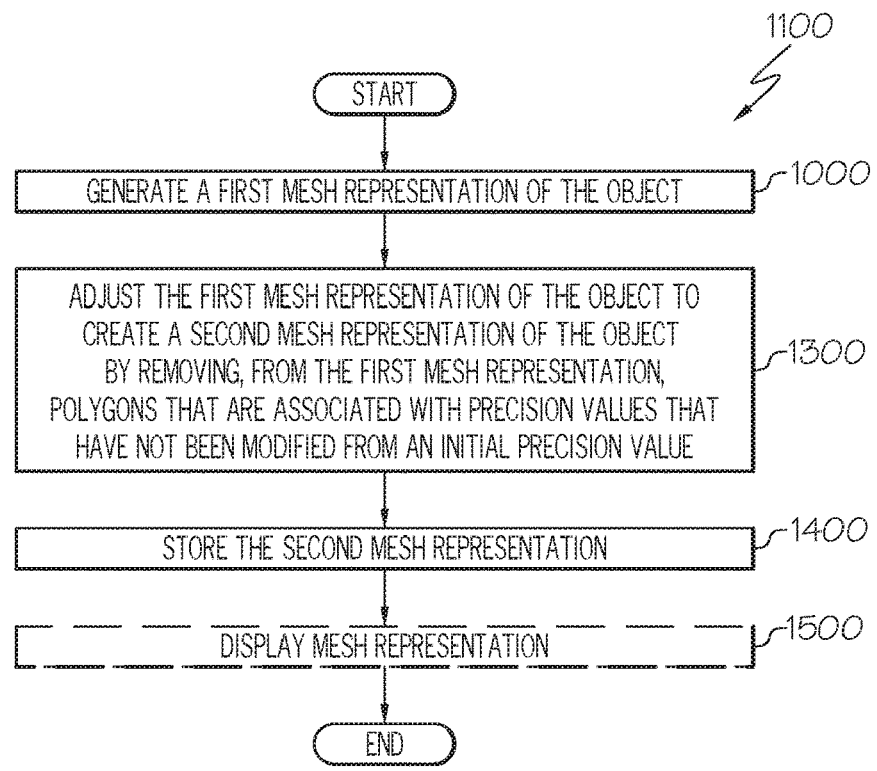
FIGS. 3A-3F are flowcharts of generating and processing a 3D mesh from a series of 2D images, according to various embodiments described herein.

FIGS. 3A-3F are flowcharts for generating and processing a 3D mesh from a series of 2D images, according to various embodiments described herein. FIG. 3a illustrates a flowchart for the generation of a 3D mesh representation of an object, according to various embodiments described herein.

Referring now to FIG. 3A, methods, systems, and computer program products for the generation of a 3D mesh representation of an object may include block 1000 to generate a first mesh representation of an object. In block 1300, the first mesh representation generated in block 1000 may be adjusted to create a second, truncated, mesh representation of the object by removing, from the first mesh representation, at least one polygon whose vertices have precision values that have not been modified from an initial precision value. The method may continue at block 1400 to store the second mesh representation and, optionally, display the second mesh representation (e.g., in an augmented reality environment, or associated with a 3D printer) at block 1500. In some embodiments, the methods, systems, and computer program products may be performed by a processor of an electronic device, which may include multiprocessor electronic devices, virtual electronic devices, and/or distributed computing systems, such as those utilized in a cloud infrastructure. Details of the operations illustrated in FIG. 3A will be described further herein.

Figure 3B:
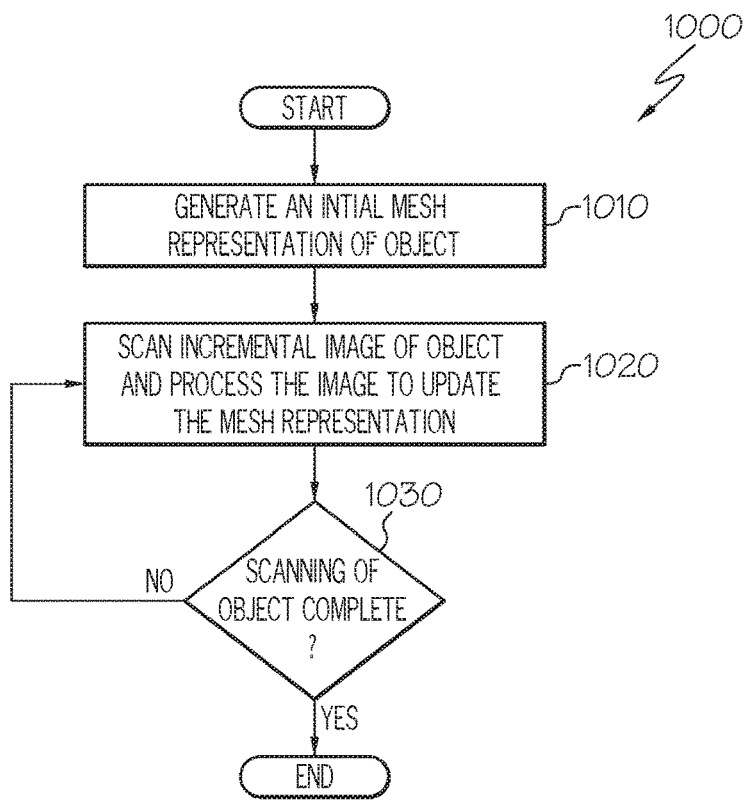

FIG. 3B illustrates a flowchart for generating the first mesh representation (block 1000), according to various embodiments described here. Referring to FIG. 3B, generating the first mesh representation may include the generation of an initial mesh representation of the object (block 1010).

Figure 3C:
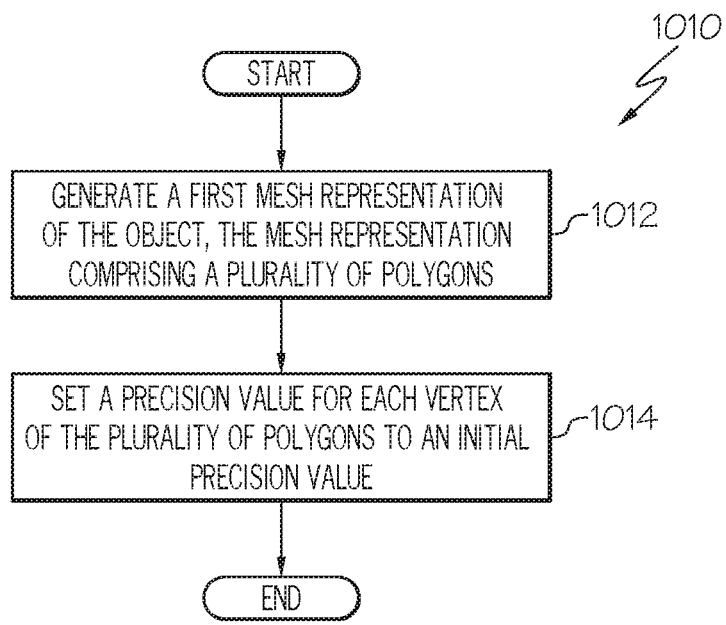
Figure 4:
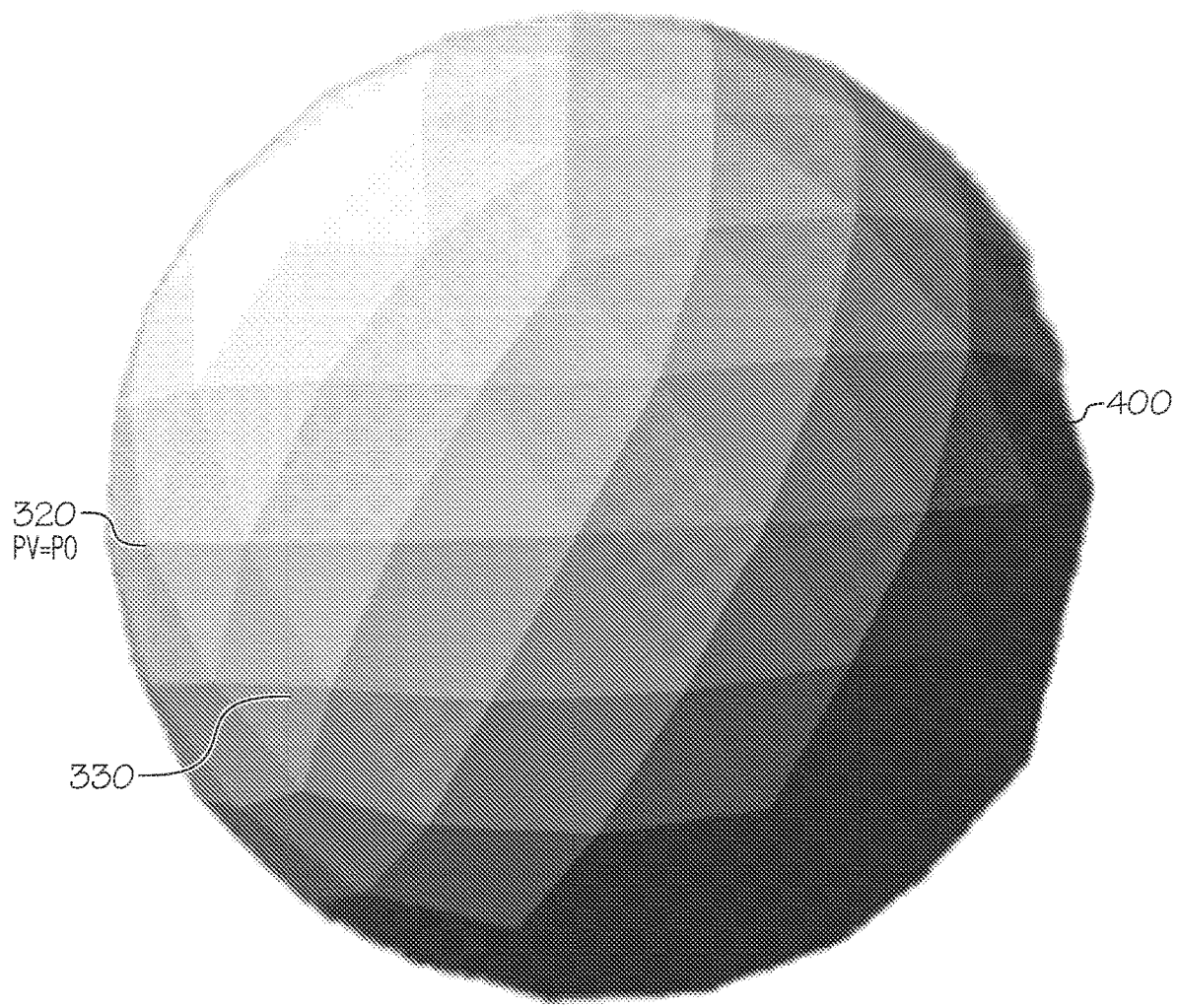
FIG. 4 illustrates an initial mesh representation an object, according to various embodiments described herein.

The initial mesh representation may be a generic mesh representation that will be further refined responsive to subsequent scanning and analysis of the object. FIG. 3C illustrates a flowchart for generating the initial mesh representation (block 1010). Referring to FIG. 3C, in block 1012, the initial mesh representation may be generated to be composed of a plurality of polygons. For example, as illustrated in FIG. 4, the initial mesh representation 400 may be symmetrical sphere composed of a plurality of polygons 300, but the present inventive concepts are not limited thereto. In some embodiments, the polygons of the plurality of polygons 300 are triangles. The polygons 300 may include respective vertices 320 and edges 330. The polygons 300 of the mesh representation 400 may be interconnected such that respective ones of the polygons 300 share vertices 320 and/or edges 330 with other ones of the polygons 300. In some embodiments, the mesh representation 400 may be "watertight" As used herein, a watertight mesh representation 400 refers to a mesh representation 400 in which the interconnected polygons 300 form a contiguous surface across the entire mesh representation 400 such that there are no, or few, gaps or discontinuities in the mesh representation 400. Though the figures herein illustrate watertight mesh representations 400, it will be understood that mesh representations 400 that are not watertight may be adjusted, as described herein, without deviating from the scope of the present inventive concepts. The mesh representation 400 may be iteratively modified, as discussed further herein, to depict some or all of a surface of the object being reconstructed in 3D.

Referring again to FIG. 3C, in block 1014, respective vertices 320 of the initial mesh representation 400 may be initialized with a precision value. The precision value may be a data value that is associated with, and maintained for, respective ones of the vertices 320. The precision value may indicate a precision of a location of the respective vertex 320 in the mesh representation 400 related to the depicted surface of the object being scanned. During the process of the 3D model of the object 135, the mesh representation 400 may be modified from its initial state to a mesh representation 400 that more closely models the object 135. As the vertices 320 of the polygons 300 of the mesh representation 400 are modified to model the object 135, the precision value of the vertex 320 may be modified (e.g. reduced) to reflect that the vertex 320 has become more precisely aligned to the "ideal" representation of the object 135. That is to say that as the mesh representation approaches an ideal exact replica of the object, the precision value may decrease towards a value of zero. In some embodiments, the precision value may indicate a radius of a sphere between the respective vertex 320 of the mesh representation 400 and the final true destination of the vertex 320 in an ideal representation of the object. In other embodiments, the precision value may be a binary representation that indicates whether the vertex 320 has been adjusted from the initial mesh representation 400. In FIG. 4, the initial precision value is indicated by illustrating that the precision value PV of the vertices 320 is P0. In some embodiments, the initial P0 value may be 1.

In some embodiments, a polygon 300 may be associated with the precision value of each vertex 320 of the polygon 300. In other embodiments, the precision value may be maintained at the polygon 300, such that the precision value for the polygon 300 is adjusted if any vertex 320 of the polygon 300 is adjusted. Thus, though the description herein discusses operations related to the precision values of vertices 320, it will be understood that the same or similar operations may be performed with respect to polygons 300 without deviating from the embodiments described herein.

Referring again to FIG. 3B, the operations may continue with block 1020 to scan incremental images of the object and update the mesh representation 400 of the object based on the incremental images. The incremental images may include one or more 2D images of the object. If the scanning is not complete, as determined at block 1030, the operations may repeat block 1020 to incrementally scan images of the object and farther refine the mesh representation 400.

Figure 3D:
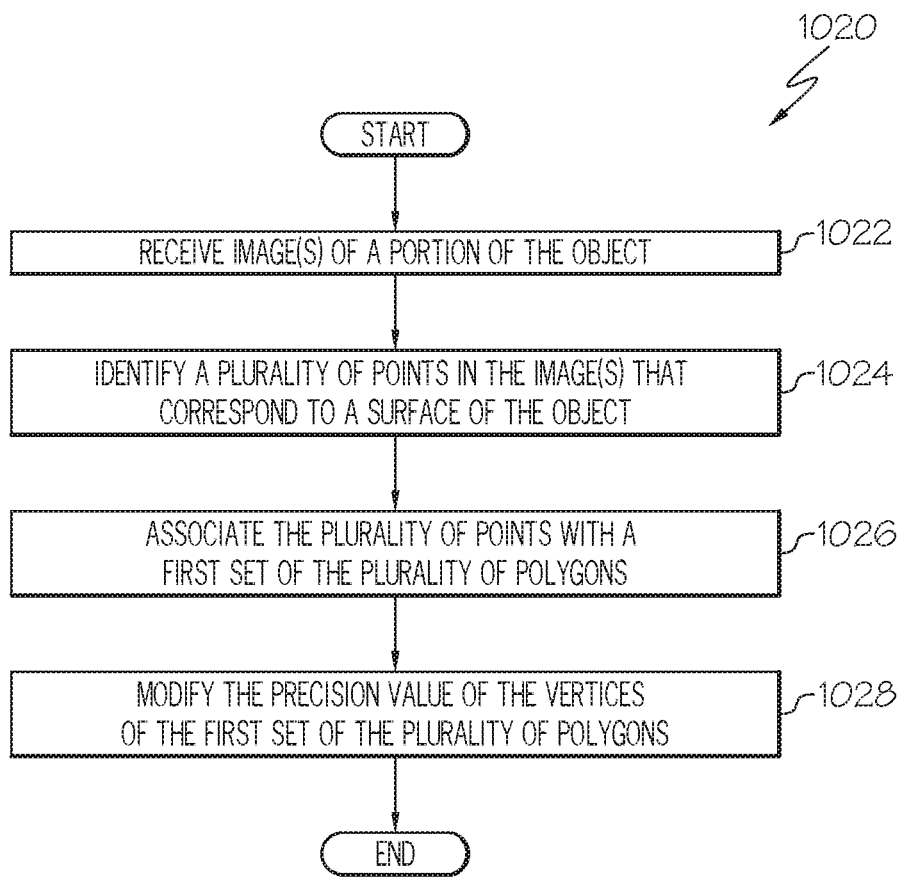

FIG. 3D illustrates a flowchart for repeatedly scanning images of an object and processing the images to update the mesh representation 400 (block 1020) according to various embodiments described herein. Referring to FIG. 3D, the operations may include block 1022 of receiving one or more 2D images of the object. These images may be received from an image sensor or camera or may be received as images stored in an appropriate data format. In block 1024, the one or more images may be processed to identify a plurality of points in the one or more images that correspond to a surface of the object. In block 1026, the operations may associate the plurality of points with a first set of the plurality of polygons 300 of the mesh representation 400. As part of the processing, in block 1028, the precision value associated with vertices 320 of the first set of the plurality of polygons 300 may be modified.

For example, as illustrated in FIG. 1, a user 110 may have a camera 100 with which they initiate a photographic session of the object 135, such as a person's face or other object, at location 120*a*. The user 110 may physically move around the object 135 to various locations such as from location 120*a* to location 120*b*, or the object 135 may be moved in relation to the camera 100. One or more images of the object 135 may be captured at each location. For example, image 130*a* may be captured when the camera 100 is at location 120*a* and image 130*b* may be captured when camera 100 moves to location 120*b*. Each of the captured images may be 2D images. There may be a continuous flow of images from the camera 100 as the user 110 walks around the object 135 that is being scanned to capture images at various angles. Once the images, such as images 130*a* and 130*b* are captured, the images may be processed by a processor in camera 100 or a processor external to the camera 100 to generate a 3D image. In some embodiments, a baseline initialization of the 3D image may occur once the first two images ore captured. The quality of the baseline initialization is evaluated to see if a satisfactory baseline initialization has occurred. Otherwise, further processing of additional images may take place.

In some embodiments, the baseline initialization may indicate the object 135 to be scanned, as well as overall rough dimensions of the object 135. The initial mesh representation 400 may be formed to enclose the dimensions of the object 135, and further images may be repeatedly processed to refine the mesh representation 400 of the object 135.

The images may be processed by identifying points on the object 135 that were captured the first image 130a, the second image 130b, and/or subsequent images. The points may be various edges, corners, or other points on the object 135. The points are recognizable locations on the physical object 335 that may be tracked in various images of the physical object 135. Still referring to FIG. 1, points on the object 135 may include points 140 through 144. When the user 110 moves the camera 100 to a different location 120b, another image 130b is captured. This same process of capturing images and identifying points may occur on the order of tens, hundreds, or thousands of times in the context of creating a 3D image. The same points 140 through 144 may be identified in the second image 130b. The spatial coordinates, for example, the X, Y, and/or Z coordinates, of the points 140 through 144 may be estimated using various statistical techniques.

Figure 2A:
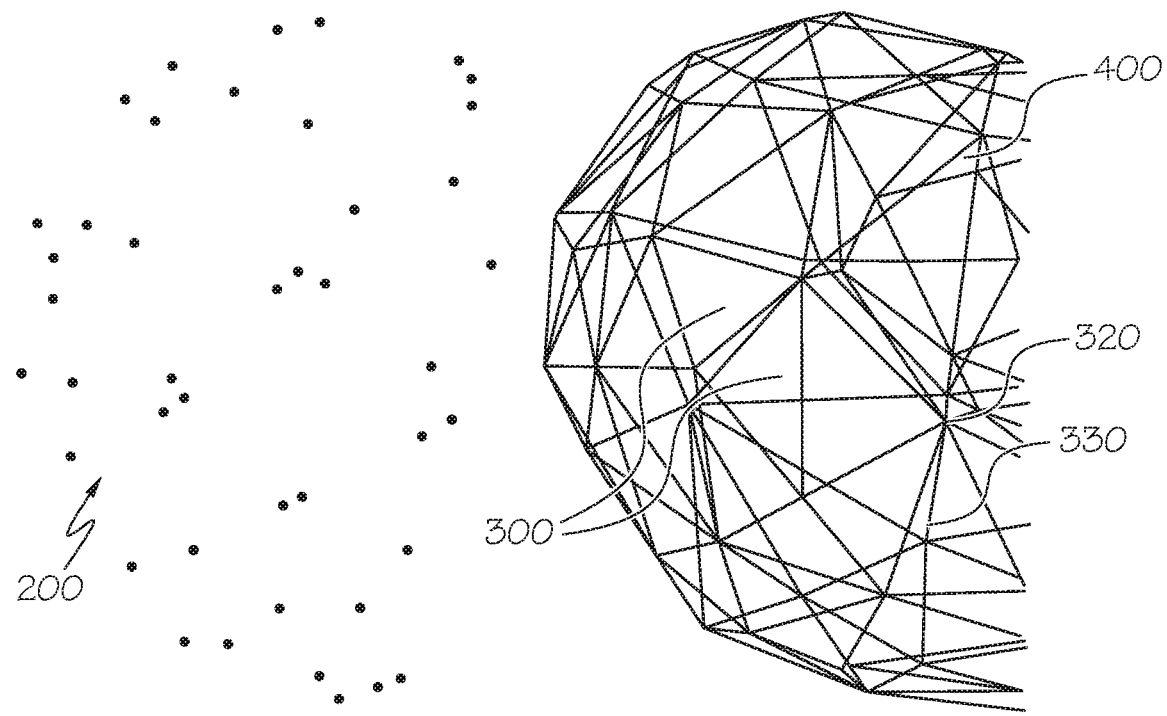
FIG. 2A illustrates the generation of a point cloud and mesh representation based on a 2D image, according to various embodiments described herein.

FIG. 2A illustrates the generation of a point cloud 100 and mesh representation 400 based on a 2D image, according to various embodiments described herein. As illustrated in FIG. 2A, analysis of each image (e.g., images 130a and 130b) may result in the identification of points 140 through 144, which may collectively be referred to as point cloud 200, which is a plurality of points 200 identified from respective images of the object 135. From these identified plurality of points 200, methods, systems, and computer program products according to the present inventive concepts update characteristics of the mesh representation 400 of the object 135 in block 1020. As described herein, the mesh representation 400 may be composed of a plurality of polygons 300 including edges 330 and vertices 320.

Respective vertices 320 of the mesh representation 400 may be associated with the surface of the object 135 being scanned and tracked. The points 200 may represent contours and/or other features of the surface of the object 135. Operations for generating a mesh representation 400 of the object 135 may attempt to map the plurality of points 200 extracted from a 2D image of the object 135 onto the polygons 300 of the mesh representation 400. It will be recognized that the mesh representation 400 is incrementally improved based on subsequent images, as the subsequent images provide additional points 200 which may be mapped to the plurality of polygons 300 of the mesh representation 400.

Refining the mesh representation 400 given a point cloud 200 may involve mathematically projecting the 3D location of the plurality of points 200 inferred from an image into and/or onto the mesh representation 400. For each point of the plurality of points 200, an analysis may be performed to determine whether the point lays on the mesh representation 400, or whether the point is off (e.g., above/below/beside in a 3D space) the mesh representation 400. If the point is on the mesh representation 400, the point may be associated with a polygon of the polygons 300 of the mesh representation 400 that contains the point. If the point is off the mesh representation 400, it may indicate the mesh representation 400 needs to be adjusted. For example, the new point of the plurality of points 200 may indicate that the arrangement of the polygons 300 of the current mesh representation 400 is inaccurate and needs to be adjusted.

In some embodiments, to adjust the mesh representation 400, a vertex 320 of one of the polygons 300 of the mesh representation 400 may be moved to a location in 3D space corresponding to the point of the point cloud 200 being analyzed, but the present inventive concepts are not limited thereto. In some embodiments, to adjust the mesh representation 400, the polygons 300 of the mesh representation 400 may be reconfigured and/or new polygons 300 added so as to include a location in 3D space corresponding to die point of the point cloud 200 being analyzed in the surface of the mesh representation 400. In some embodiments, the adjustment of the mesh representation 400 may be weighted so that the mesh representation 400 moves toward, but not entirely to, the location in 3D space corresponding to the point of the point cloud 200 being analyzed. In this way, die mesh representation 400 may gradually move towards the points of a point cloud 200 as multiple images are scanned and multiple point clouds 200 are analyzed.

Figure 2B:
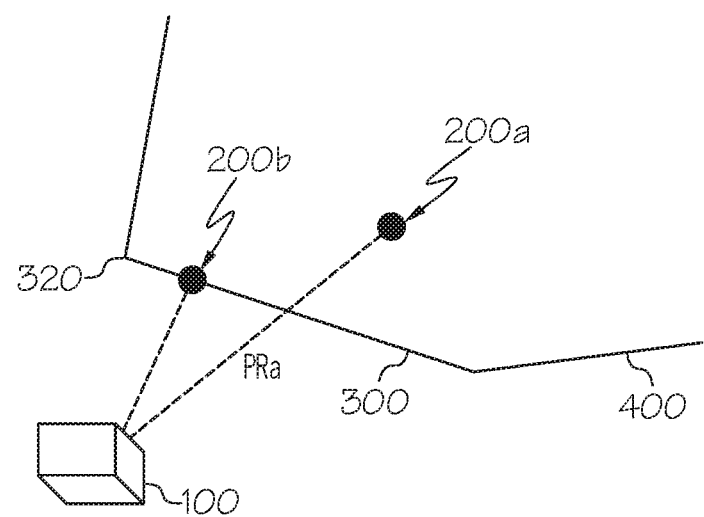
FIG. 2B illustrates a 2D representation of a portion of a mesh representation including polygons and points of a point cloud, according to various embodiments described herein.

FIG. 2B illustrates a 2D representation of a portion of a mesh representation 400 including polygons 300 and points 200a, 200b of a point cloud 200, according to embodiments as described herein. For example, as illustrated in FIG. 2B, projecting a first point 200a of the point cloud 200 onto the mesh representation may include forming a ray PRa from the origin (e.g., the camera 100) to the point 200a. Recall that both the points of the point cloud 200 and the mesh representation 400 may include 3D depth information (e.g., X, Y, and/or Z coordinates). Thus, an individual point 200a of the point cloud 200 can be spatially located with respect to the mesh representation 400. The formed ray PRa may indicate an intersection point in a polygon 300 of the mesh representation 400. FIG. 2B illustrates similar operations performed for a second point 200b of the point cloud 200. In some embodiments, the intersection of rays to the points (e.g., points 200a, 200b) of the point cloud 200 with polygons 300 of the mesh representation 400 indicate which portions and/or locations of the mesh representation 400 need to be adjusted to further refine the 3D image of the object 135.

A point (e.g., points 200a, 200b) of the point cloud 200 that is projected into/onto a polygon 300 of the mesh representation 400 may be mapped to and/or associated with that polygon 300 in block 1026. Mapping the point of the point cloud 200 to a particular polygon 300 may also result in that point being mapped to and/or associated with each vertex 320 and edge 330 of that mapped polygon 300. In some embodiments, the mapping of the point may be one-to-many, since a point that is projected into/onto a polygon 300 of the mesh representation 400 may be associated with the polygon 300, each of its edges 330, and each of its vertices 320.

As the points of the point cloud 200 are mapped to and/or associated with the vertices 320 of the polygons 300, the respective precision values associated with the vertices 320 may also be adjusted in block 1028. That is to say that as the plurality of points 200 are mapped to specific vertices 320 of the polygons 300, the precision value of the vertex 320 may be modified (e.g. reduced) to reflect that the vertex 320 has become more precisely aligned to the "ideal" representation of the object 135. In this way, the precision value for a particular vertex 320 may be based on the 3D spatial coordinates (e.g., X, Y, Z coordinates) of the points 200 that are mapped to the vertex 320. As the process continually refines the mesh representation 400 by processing and adjusting the vertices 320 of the polygons 300, the precision values of those vertices 320 which have been mapped to scanned points 200 on the object 135 will be adjusted. In some embodiments, as the vertices 320 of the mesh representation 400 are refined to more closely approximate the surface of the object 135 being scanned, the precision value of the vertices 320 may be decreased. In some embodiments, as the vortices 320 move closer to their final location in the mesh representation 400, the precision value may decrease towards zero.

In some embodiments, a location of a point of the point cloud 200 may be incongruous with the mesh representation 400. That is to say that a determined location of the point of the point cloud 200 is greater than a predetermined distance from the inferred location of a surface of the mesh representation 400. Such a point may be discarded from processing. For example, the point may be an outlier, a digital artifact, or, as described herein, a background point which may not be included in the formulation of the surface of the mesh representation 400. By ignoring certain points in processing, undesired alteration of the mesh representation responsive to outlier and/or background points is reduced and/or eliminated.

As described further herein, respective points of the point cloud 200 may be associated with and/or mapped to polygons 300 of the mesh representation 400. For example, respective points of the point cloud 200 may be associated with polygons 300 at existing locations of the mesh representation 400 or polygons 300 at adjusted locations of the mesh representation 400. The precision values of the respective vertices 320 of those polygons 300 associated with the point cloud 200 may be adjusted from their initial value.

As illustrated in FIG. 3B, embodiments described herein (block 1020) may be repeated for multiple scans of object 135, repeatedly and continuously updating and refining the mesh representation 400 of the object 135. Similarly, as vertices 320 of the polygons 300 of the mesh representation 400 are mapped and adjusted, the precision values of those vertices 320 may also be adjusted.

Figure 5:
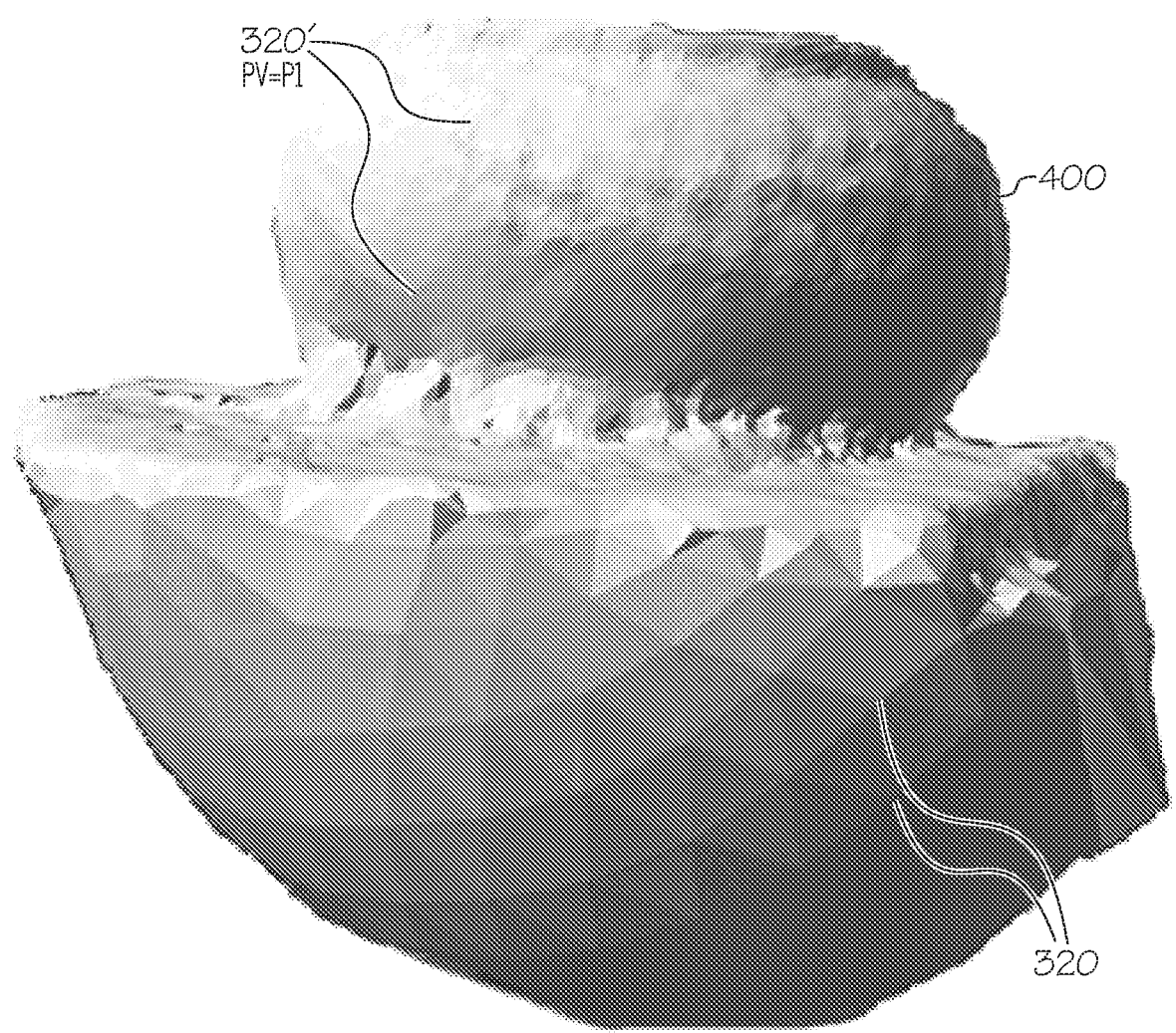
FIG. 5 illustrates a mesh representation which has been refined from the initial mesh representation of FIG. 4, according to various embodiments described herein.

For example, FIG. 5 illustrates a mesh representation 400 which has been refined from an initial mesh representation 400 illustrated in FIG. 4. As illustrated in FIG. 5, vertices 320' of the mesh representation 400 have been adjusted from their original locations responsive to scanned images of an object 135. The adjustment of the mesh representation 400 has resulted in the position and quantity of the vertices 320' changing (e.g., block 1020 of FIG. 3B). In addition, as the vertices 320' have changed, the precision values of the vertices 320' have also changed (e.g., block 1028 of FIG. 3D). This is illustrated in FIG. 5 by illustrating that the precision value PV associated with the vertices 320' that have been adjusted has been changed to PI. As also illustrated in FIG. 5, the processing of die images may result in some of the vertices 320 not being changed from their initial value. For example, FIG. 5 illustrates an example where the bottom half of the mesh representation 400 retains the original shape and configuration of the initial mesh representation 400 illustrated in FIG. 4. These vertices 320 may not have been adjusted because they were not mapped to points of the point cloud 200 during the scanning of the object 135. In some embodiments, this may indicate that the scanning system did not receive images which illustrated those portions of the object. Because these vertices 320 of the mesh representation 400 have not been modified, they retain the original precision value. For example, as illustrated in FIG. 5, the precision value PV for the unmodified vertices 320 may remain at the initial precision value P0.

Thus, after processing, the mesh representation 400 may include vertices 320' whose precision values have changed from the initial precision value, and vertices 320 whose precision values have not changed from the initial precision value.

Referring again to FIG. 3A, once the scanning and generating of the first mesh representation 400 is complete, the operation may continue with block 1300 to create a second, truncated, mesh representation 400' by removing from the first mesh representation 400 polygons 300 whose vertices 320 have precision values that have not been modified from an initial precision value.

Figure 3E:
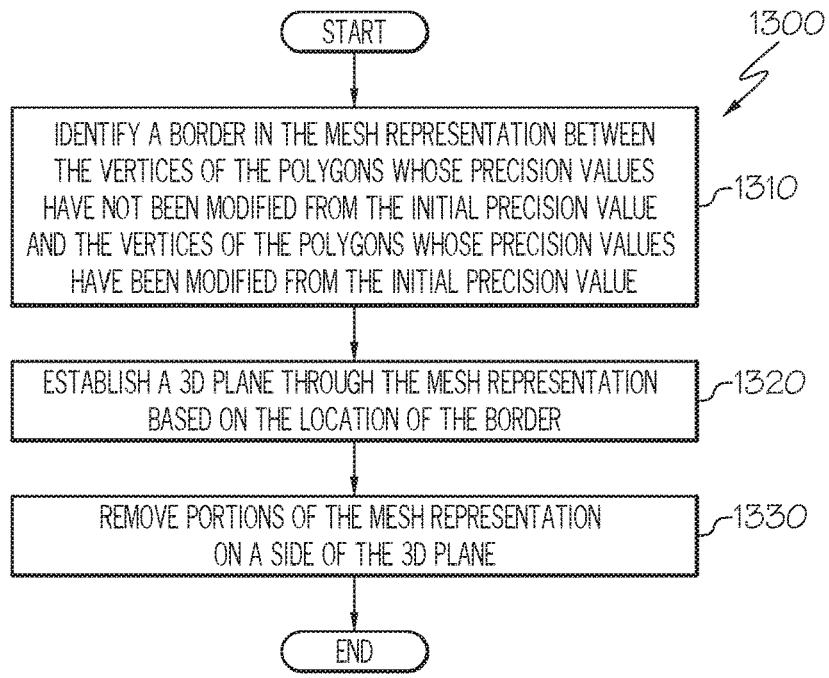
Figure 6:
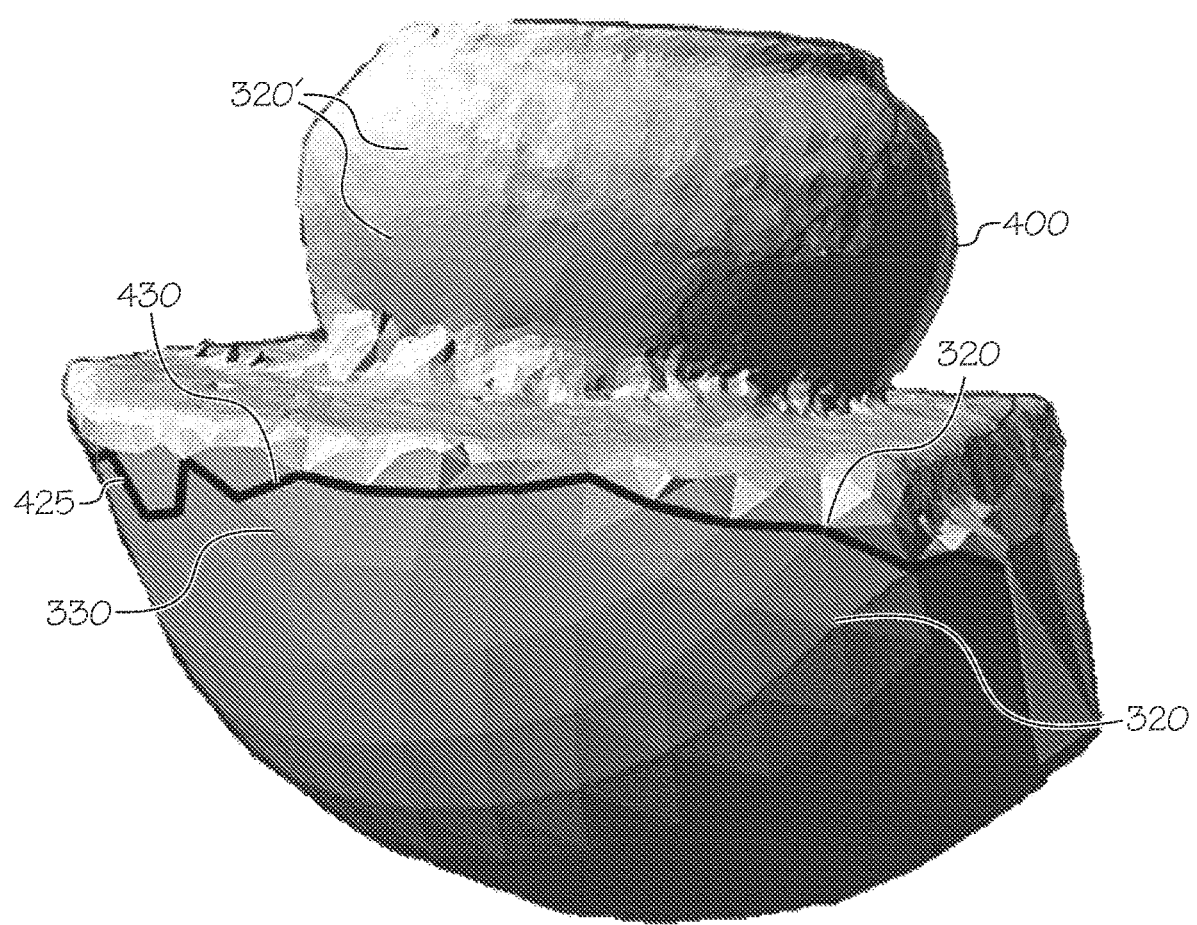
FIG. 6 illustrates a border in a mesh representation between modified and unmodified portions of the mesh representation of FIG. 5, according to various embodiments described herein.

FIG. 3E illustrates a flowchart for removing portions of the mesh representation 400 according to various embodiments described herein. As illustrated in FIG. 3E, creating the truncated mesh representation 400' may include operation 1310 to identify a border 425 in the mesh representation 400 between the vertices 320 whose precision values have not been modified from the initial precision value and vertices 320' whose precision values have been modified from the initial precision value. FIG. 6 illustrates a border in a mesh representation between modified and unmodified portions of the mesh representation of FIG. 5, according to various embodiments described herein. As illustrated in FIG. 6, a border 425 may delineate an approximate line in the mesh representation 400 between those polygons 300 that contain vertices 320' that have been adjusted during processing and those vertices 320 which have not been adjusted during processing.

As noted previously, the polygons 300 may include vertices 320 connected by edges 330. Generating the border 425 may include examining edges 330 of the polygons 300 of the mesh representation 400. Each respective edge 330 of the polygons 300 may connect two different vertices (e.g., vertices 320 or 320') of the polygon 300. The edges 330 of the polygon 300 may be analyzed to determine those edges 330 that connect one vertex 320' whose precision value has been changed from the initial precision value to one vertex 320 whose precision value has not changed from the initial precision value. These edges 330 may be denoted as border edges 430. Stated another way, a border edge 430 has one end that is a vertex 320 whose precision value has not changed from the initial precision value and one end that is a vertex 320' whose precision values has been changed from the initial precision value. Border 425 may be formed by identifying a contiguously connected sequence of border edges 430 within the mesh representation 400 in which the last border edge 430 in the sequence connects to the first border edge 430 in the sequence. In some embodiments, the sequence of border edges 420 may from a circuitous path around a periphery of the mesh representation 400. Multiple contiguously connected sequences of border edges 430 may be possible. In some embodiments, the border 425 may be selected as the longest contiguously connected sequence of border edges 430 in which the last border edge 430 in the sequence connects to the first border edge 430 in the sequence, though the present inventive concepts are not limited thereto. It will be recognized that the border 425 may not be a straight line.

Figure 7:
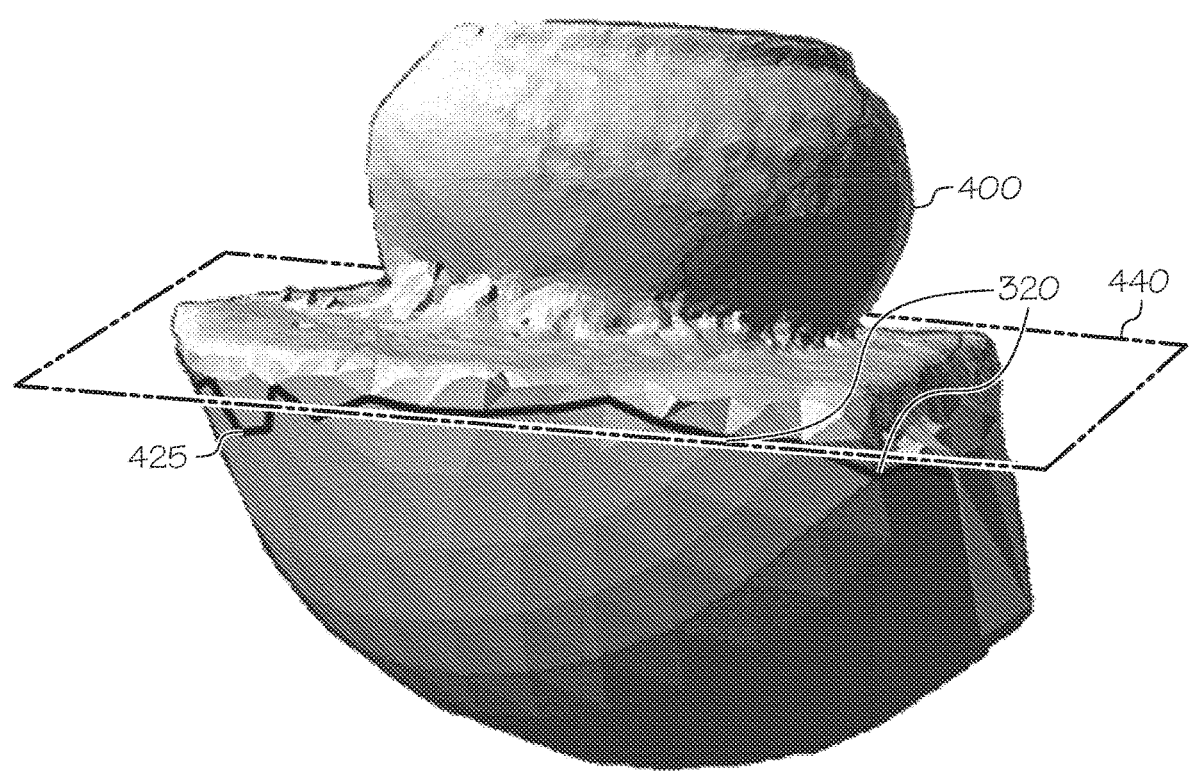
FIG. 7 illustrates a plane intersecting the border in the mesh representation of FIG. 6, according to various embodiments described herein.

Referring to FIG. 3E, once a border 425 has been identified, operations may continue with block 1320 to establish a 3D plane 440 through the mesh representation 400 based on the location of the border 425. Operations to form the 3D plane 440 may include establishing a plane that fits and, in some embodiments, best fits, the three dimensional arrangement of the vertices 320, 320' on the border 425. FIG. 7 illustrates the formation of the 3D plane 440 through the vertices 320, 320' on the border 425. As illustrated in FIG. 7, establishing the location of the 3D plane 440 may define a plane intersecting the border 425.

Figure 8:
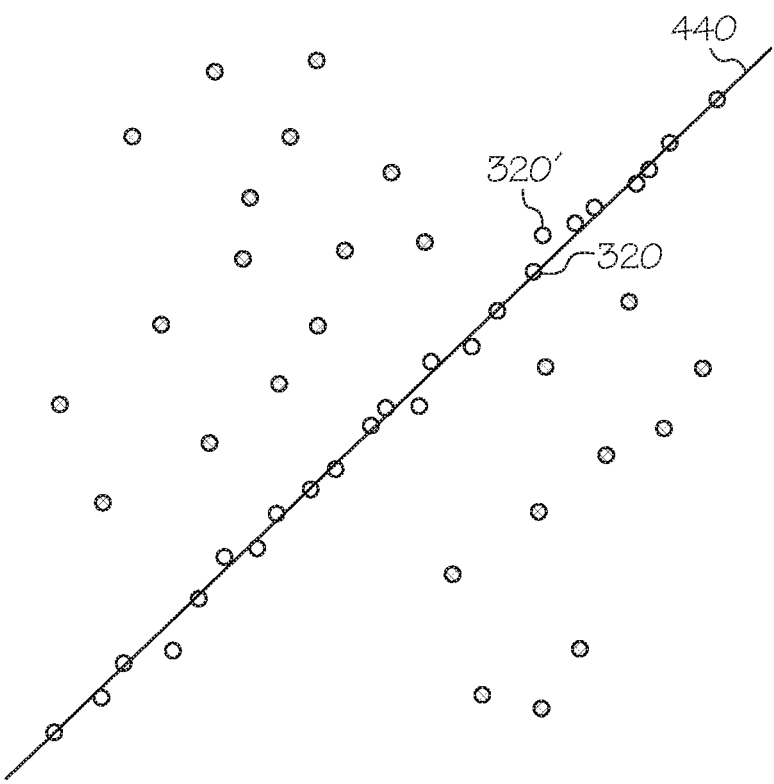
FIG. 8 illustrates an example creation of a best fit 3D plane through a series of vertices that make up a border, according to various embodiments described herein.

In some embodiments, matching a 3D plane 440 to the vertices 320, 320' on the border 425 may include a statistical operation, such as random sample consensus (RANSAC) calculation that is performed on the vertices 320, 320' on the border 425. RANSAC is an iterative technique to estimate parameters of a mathematical model from a set of observed data containing outliers, where the model attempts to give little to no weight to the outliers on the estimated parameters. The RANSAC calculation may determine the 3D plane 440 that best fits the 3D coordinates of the sample set of vertices 320, 320f on the border 425. FIG. 8 illustrates the creation of best fit 3D plane 440 through a series of vertices 320, 320' that make up the border 425.

Figure 3F:
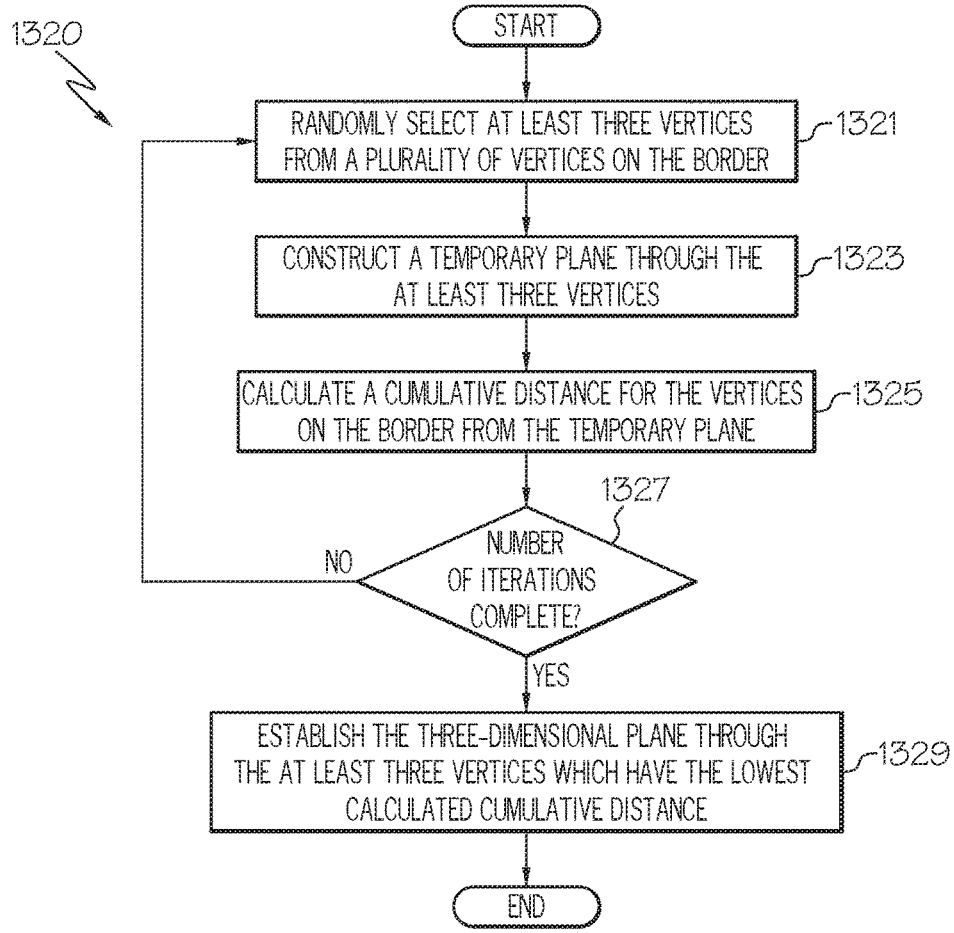

In some embodiments, block 1320 to determine the location of the 3D plane 440 may incorporate a series of distance calculations based on a randomly-selected subset of the vertices 320, 320' on the border 425. FIG. 3F is a flowchart for calculating the 3D plane 440 of block 1320. As illustrated in FIG. 3P, calculating the 3D plane 440 may include block 1321 to randomly select at least three vertices 320, 320' from those vertices 320, 320' on the border 425. As noted previously, the border 425 may be composed of contiguous border edges 430, each of which connects one vertex 320 whose precision values has not been modified from the initial precision value and one vertex 320' whose precision value has been modified from the initial precision value. Thus, the border 425 may include both vertices 320 and 320'.

Figure 9:
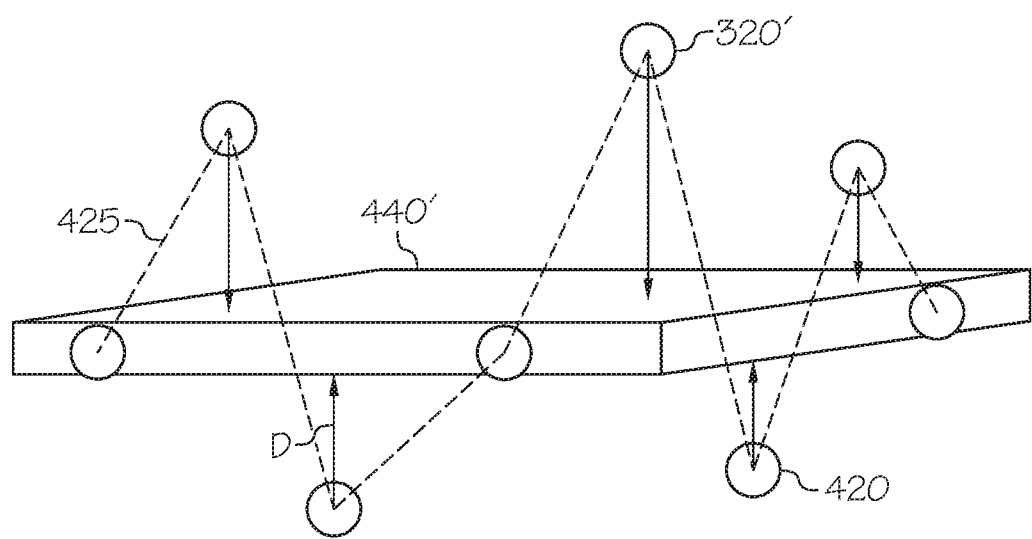
FIG. 9 illustrates on example creation of a best fit 3D plane through a series of vertices that make up a border, according to various embodiments described herein.

After selecting the at least three random vertices 320, 320', the operation may continue with block 1323 to construct a temporary plane 440' through the at least three vertices 320, 320'. Once the temporary plane 440' has been established, the operation may continue at block 1325 to calculate a cumulative distance from all of the vertices 320, 320' of the border 425 to the temporary plane 440'. The cumulative distance may be the sum of all the individual distances of each of the vertices 320, 320' of the border 425 to the temporary plane 440'. FIG. 9 illustrates an example formulation of the temporary plane 440'. As illustrated in FIG. 9, each of the vertices 320, 320' of the border 425 will be located a particular distance D from the temporary plane 440'. Once the cumulative distance is calculated, the selection of at least three vertices 320, 320', the construction of a temporary plane 440', and the calculation of the cumulative distance of the vertices 320, 320' of the border 425 from the temporary plane 440' may be repeated for a predetermined number of iterations (block 1327) to establish set of calculated cumulative distances for the predetermined number of temporary planes 440'. Once the predetermined number of iterations is completed, the final 3D plane 440 may be designated as that temporary plane 440' which had the lowest calculated cumulative distance of each of the temporary planes analyzed (block 1329).

Though the RANSAC method and comparative calculation of a predetermined number of sample planes have been described, the present inventive concepts are not limited thereto. It will be understood by those of skill in the art that multiple techniques are possible to map a best-fit 3D plane to a selected series of 3D points. Thus, die spirit and scope of the present inventive concepts encompass multiple techniques for forming a 3D plane 440 through the vertices 320, 320' of the border 425.

Referring again to FIG. 3F, after establishing the 3D plane 440, forming the truncated mesh 400' may continue with block 1330 by removing portions of the mesh representation 400 on a side of the three-dimensional plane 440. The 3D plane 440 may represent a plane intersecting the mesh representation 400 through a border 425 between polygons 300 of the mesh representation 400 that have been adjusted during processing and polygons 300 that have not been adjusted during processing. Forming the truncated mesh representation 400 may include removing a portion of those polygons 300 that have not been adjusted during processing.

The 3D plane 440 will intersect the mesh representation 400 and divide the mesh representation 400 into two sections. One of the two sections on either side of the 3D plane 440 may be selected for removal. In some embodiments, the section will be selected based on which section of the mesh representation 400 contains the largest number of vertices 320 whose precision values have not been modified from the initial precision value. In some embodiments, the section will be selected based on which section has the smallest volume.

Figure 10:
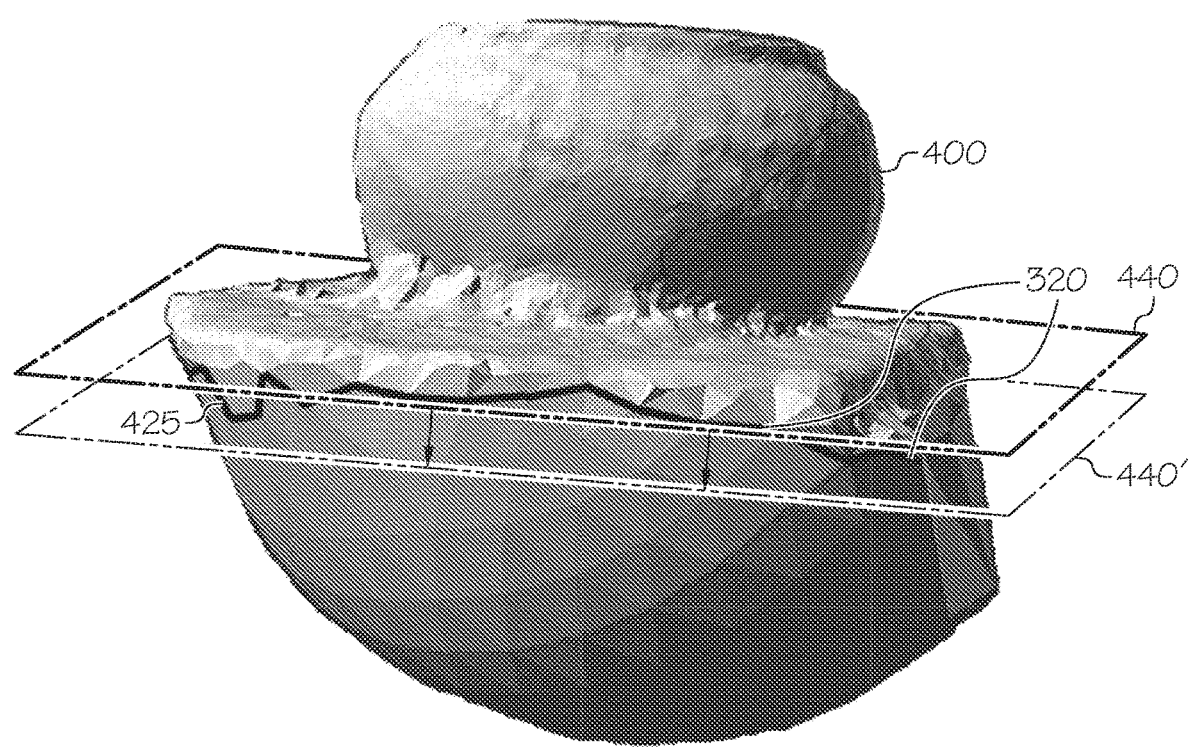
FIG. 10 illustrates on example translation of a best fit 3D plane in a normal, direction, according to various embodiments described herein.

In some embodiments the selected section may be further reduced by translating the 3D plane 440 in a direction perpendicular to the surface of the 3D plane 440 (e.g., a normal direction to the 3D plane 440). FIG. 10 illustrates an example of such a translation of a first position of the best fit 3D plane 440 in a normal direction to a second position for the translated 3D plane 440', according to various embodiments described herein. This translation may establish the translated 3D plane 440' away from the border 425. As described herein, the 3D plane 440 will provide a boundary for polygons 300 of the mesh representation 400 to be removed. By establishing the translated 3D plane 440', the boundary for removal of the polygons 300 may move, which can provide an increased buffer within the formation of the truncated mesh representation 400' described further herein. The distance of translation may vary based on the object 135 being scanned, and may, in some embodiments, be varied based on a preferred aggressiveness for removal of the polygons 300 of the mesh representation 400. The translation illustrated in FIG. 10 is optional, and in some embodiments the 3D plane 440 may not be translated prior to removal.

Once the section is selected, polygons 300 within the selected section of the mesh representation 400 may be removed from the mesh representation 400 to form the truncated mesh representation 400'. In some embodiments, only those polygons 300 which are within the section to be removed and contain only vertices 320 whose precision values have not been modified from the initial precision value will be removed. In some embodiments, only those polygons 300 which are completely enclosed within the selected section (i.e., contain no edges 330 or vertices 320, 320' which intersect the 3D plane 440 and/or the border 425) will be removed. In some embodiments, any polygons 300 with a portion within the selected section (i.e., any edge 330 or vertex 320, 320' is within the selected section) will be removed. Once the identified polygons 300 are removed from the mesh representation 400, the remaining polygons 300 may be adjusted to reconnect the remaining polygons 300 to form the truncated mesh representation 400'. In some embodiments, only those polygons 300 that are at least a predetermined distance away from the 3D plane 440 in a line normal to the 3D plane 440. By removing only those polygons 300 that the predetermined distance from the 3D plane 440 in a line normal to the 3D plane 440, a buffer similar to that described with respect to FIG. 10 may be created in the truncated mesh representation 400'.

As mentioned herein, a mesh representation 400, 400' may be watertight, meaning that each polygon 300 of the mesh representation 400, 400' may be connected to another polygon 300 so as to create a contiguous, seamless surface. When creating the truncated mesh representation 400', the watertight feature of the truncated mesh representation 400' may be maintained. That is to say that the removal of the polygons 300 may be done so that any remaining polygons 300 of the truncated mesh representation 400' are reconnected to other polygons 300.

Figure 11:
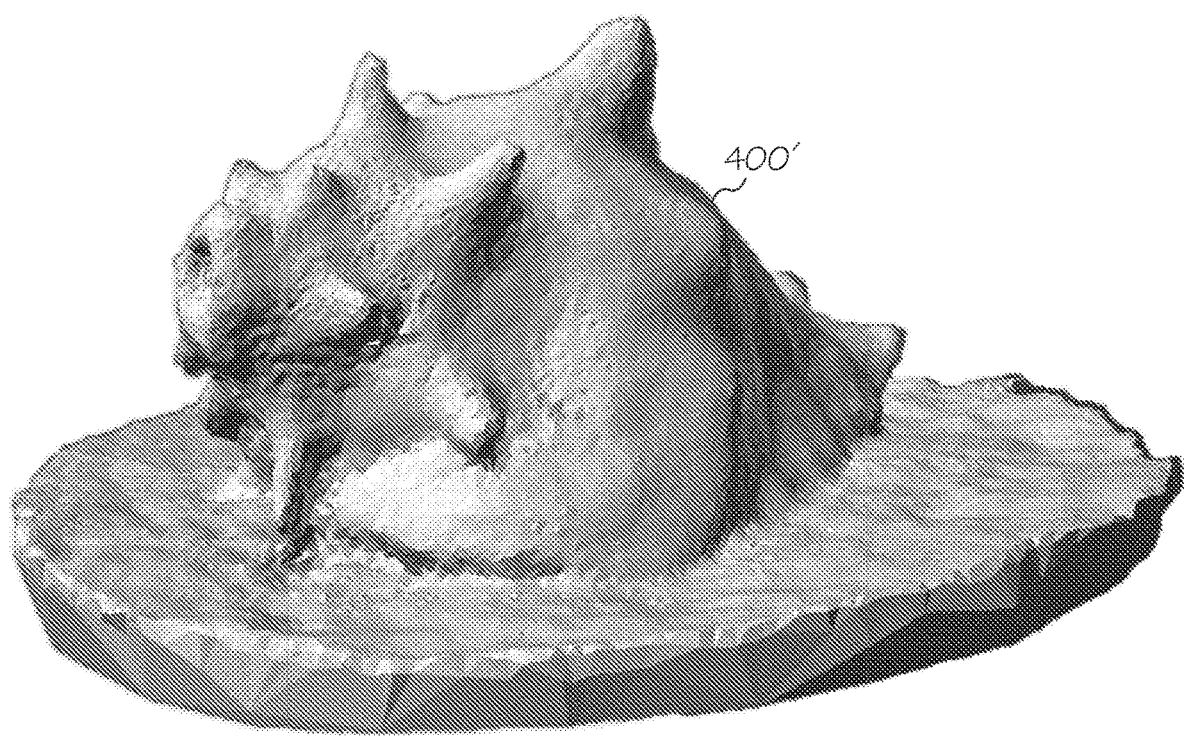
FIG. 11 illustrates a truncated mesh representation of an object, according to embodiments described herein.

FIG. 11 illustrates a truncated mesh representation 400' of an object 135, according to embodiments described herein. As illustrated in FIG. 11, truncation of the mesh representation 400 to create the truncated mesh representation 400' reduces the overall size and/or volume of the mesh representation 400. The reduction allows for reduced processing time, reduced storage, and greater overall efficiency in processing the 3D representation of the object. In some embodiments, a depth of the base, or socle, of the truncated mesh representation 400' may be adjusted by adjusting the translation of the 3D plane 440' as discussed herein with respect to FIG. 10.

Referring back to FIG. 3A, once the mesh representation 400 has been adjusted to create the truncated mesh representation 400', the truncated mesh representation 400' may be stored in block 1400, such as in the memory or storage of an electronic device 700 (see FIG. 1). The truncated mesh representation 400' may also be used in further processing of the object 135.

In some embodiments, the truncated mesh representation 400' may be displayed on a graphical display and/or output of the electronic device 700 (see FIG. 12) in block 1500. Similarly, during processing of the 3D representation of the object 135, intermediate mesh representations 400 may be displayed on the graphical display and/or output of the electronic device 700 (see FIG. 12), though the present inventive concepts are not limited thereto. In some embodiments, the truncated mesh representation 400' may be stored for display on another electronic device. For example, the truncated mesh representation 400' may be used as part of a 3D, augmented-reality, and/or immersive environment. In some embodiments, the truncated mesh representation 400' may be used to generate a 3D print file. The 3D print file may be used by a 3D printer to print a physical copy of the truncated mesh representation 400'.

Figure 12:
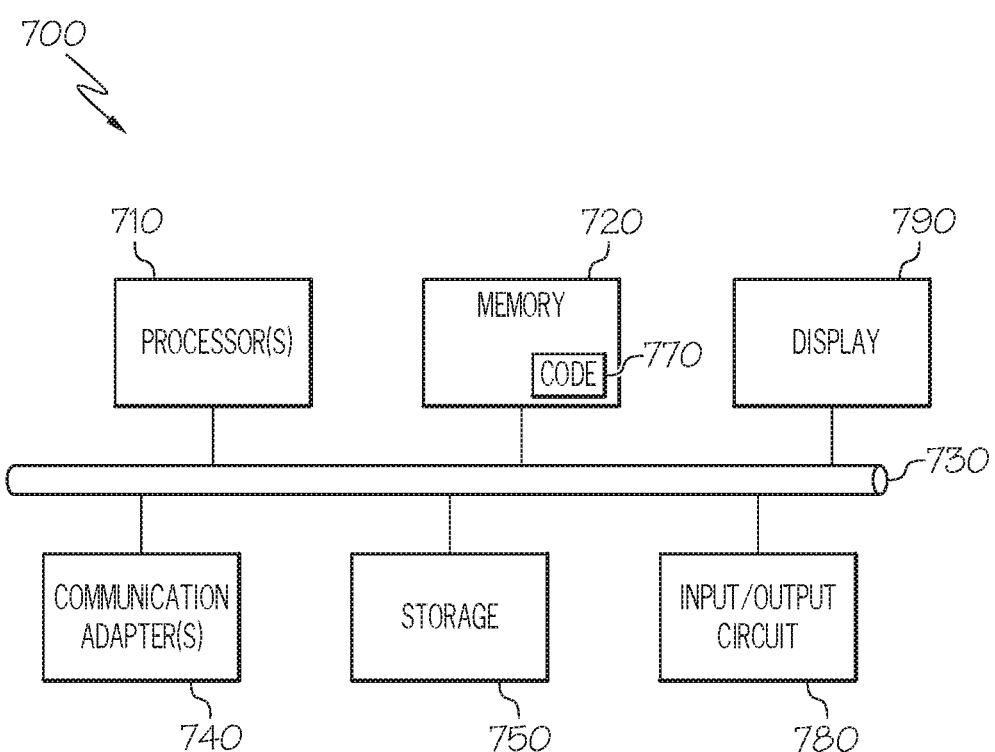
FIG. 12 is a block diagram of an electronic device 700 capable of implementing the inventive concepts, according to various embodiments described herein.

FIG. 12 is a block diagram of an electronic device 700 capable of implementing the inventive concepts, according to various embodiments described herein. The electronic device 700 may use hardware, software implemented with hardware, firmware, tangible computer-readable storage media having instructions stored thereon and/or a combination thereof, and may be implemented in one or more computer systems or other processing systems. The electronic device 700 may also utilize a virtual instance of a computer. As such, the devices and methods described herein may be embodied in any combination of hardware and software. In some embodiments, the electronic device 700 may be part of an imaging system. In some embodiments, the electronic device 700 may be in communication with the camera 100 illustrated in FIG. 1.

As shown in FIG. 12, the electronic device 700 may include one or more processors 710 and memory 720 coupled to an interconnect 730. The interconnect 730 may be an abstraction that represents any one or more separate physical buses, point to point connections, or both connected by appropriate bridges, adapters, or controllers. The interconnect 730, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), JIC (I2C) bus, or an Institute of Electrical and Electronics Engineers (IEEE) standard 1394 bus, also called "Firewire."

The processor(s) 710 may be, or may include, one or more programmable general purpose or special-purpose microprocessors, digital signal processors (DSPs), programmable controllers, application specific integrated circuits (ASICs), programmable logic devices (PLDs) field-programmable gate arrays (FPGAs), trusted platform modules (TPMs), or a combination of such or similar devices, which may be collocated or distributed across one or more data networks. The processor(s) 710 may be configured to execute computer program instructions from the memory 720 to perform some or all of the operations for one or more of the embodiments disclosed herein.

The electronic device 700 may also include one or more communication adapters 740 that may communicate with other communication devices and/or one or more networks, including any conventional, public and/or private, real and/or virtual, wired and/or wireless network, including the Internet. The communication adapters 740 may include a communication interface and may be used to transfer information in the form of signals between the electronic device 700 and another computer system or a network (e.g., the Internet). The communication adapters 740 may include a modem, a network interface (such as an Ethernet card), a wireless interface, a radio interface, a communications port, a PCMCIA slot and card, or the like. These components may be conventional components, such as those used in many conventional computing devices, and their functionality, with respect to conventional operations, is generally known to those skilled in the art. In some embodiments, the communication adapters 740 may be used to transmit and/or receive data associated with the embodiments for creating the mesh generation described herein.

The electronic device 700 may further include memory 720 which may contain program code 770 configured to execute operations associated with the embodiments described herein. The memory 720 may include removable and/or fixed non-volatile memory devices (such as but not limited to a hard disk drive, flash memory, and/or like devices that may store computer program instructions and data on computer-readable media), volatile memory devices (such as but not limited to random access memory), as well as virtual storage (such as but not limited to a RAM disk). The memory 720 may also include systems and/or devices used for storage of the electronic device 700.

The electronic device 700 may also include one or more input devices) such as, but not limited to, a mouse, keyboard, camera (e.g., camera 100 of FIG. 1), and/or a microphone connected to an input/output circuit 780. The input device(s) may be accessible to the one or more processors 710 via the system interface 730 and may be operated by the program code 770 resident in the memory 720

The electronic device 700 may also include a display 790 capable of generating a display image, graphical user interface, and/or visual alert. The display 790 may be accessible to the processor 710 via the system interface 730. The display 790 may provide graphical user interfaces for receiving input, displaying intermediate operations/data, and/or exporting output of the embodiments described herein.

The electronic device 700 may also include a storage repository 750. The storage repository 750 may be accessible to the processors) 710 via the system interface 730 and may additionally store information associated with the electronic device 700. For example, in some embodiments, the storage repository 750 may contain mesh representations, object data and/or point cloud data as described herein. Though illustrated as separate elements, it will be understood that the storage repository 750 and the memory 720 may be collocated. That is to say that the memory 720 may be formed from part of the storage repository 750.

In the above-description of various embodiments, it is to be understood that the terminology used herein is for the purpose of describing particular embodiments only and is not intended to be limiting of the embodiments as described herein. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

When an element is referred to as being "connected," "coupled," "responsive," or variants thereof to another element, it can be directly connected, coupled, or responsive to the other element or intervening elements may be present. In contrast, when an element is referred to as being "directly connected," "directly coupled," "directly responsive," or variants thereof to another element, there are no intervening elements present. Like numbers refer to like elements throughout. Furthermore, "coupled," "connected," "responsive," or variants thereof as used herein may include wirelessly coupled, connected, or responsive. As used herein, the singular forms "a," "an," and "the" are intended to include the plural forms as well, unless the context clearly indicates otherwise. Well-known functions or constructions may not be described in detail for brevity and/or clarity. The term "and/or" Includes any and all combinations of one or more of the associated listed items.

As used herein, the terms "comprise," "comprising," "comprises," "include," "including," "includes," "have," "has," "having," or variants thereof are open-ended, and include one or more staled features, integers, elements, steps, components or functions but does not preclude the presence or addition of one or more other features, integers, elements, steps, components, functions or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module," or variants thereof.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include Arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination. Many variations and modifications can be made to the embodiments without substantially departing from the principles of the present invention. All such variations and modifications are intended to be included herein within the scope of the present invention.

The invention claimed is:

1. A method of creating a three-dimensional mesh representation of an object, the method comprising:
   generating a first mesh representation of the object, the first mesh representation comprising a plurality of polygons, respective ones of the polygons comprising at least three vertices and at least three edges,
   wherein the respective ones of the plurality of polygons are each associated with a precision value that indicates an extent to which the respective ones of the plurality of polygons in the first mesh representation match a surface of the object, and
   wherein generating the first mesh representation of the object comprises modifying each precision value that is associated with one or more of the plurality of polygons from an initial precision value responsive to modifying the one or more of the plurality of polygons to match the surface of the object; and
   adjusting the first mesh representation of the object to create a second mesh representation of the object by removing, from the first mesh representation, a first polygon of the plurality of polygons responsive to determining that the precision value that is associated with the first polygon has not been modified from the initial precision value.

2. The method of claim 1, wherein generating the first mesh representation of the object further comprises:
   setting the precision value associated with each of the plurality of polygons to the initial precision value;
   receiving one or more images of a portion of the object;
   identifying a plurality of points in the one or more images that correspond to the surface of the object;
   associating the plurality of points with vertices of a first set of the plurality of polygons; and
   modifying each precision value associated with the respective ones of the first set of the plurality of polygons responsive to modifying the first set of the plurality of polygons within the first mesh representation based on the plurality of points that are associated with the vertices of the first set of the plurality of polygons.

3. The method of claim 1, wherein removing, from the first mesh representation, the first polygon of the plurality of polygons responsive to determining that the precision value that is associated with the first polygon has not been modified from the initial precision value comprises:
   identifying a border in the first mesh representation between the vertices of a first group of the plurality of polygons whose precision values have not been modified from the initial precision value and the vertices of a second group of the plurality of polygons whose precision values have been modified from the initial precision value, wherein the first group of the plurality of polygons comprises the first polygon;
   establishing a three-dimensional plane through the first mesh representation based on a location of the border; and
   removing the first polygon of the first mesh representation on a side of the three-dimensional plane.

4. The method of claim 3, wherein the three-dimensional plane through the first mesh representation at least partially intersects the border.

5. The method of claim 3, wherein the border comprises a contiguously connected series of edges through vertices of the first group and the second group of the plurality of polygons.

6. The method of claim 3, wherein establishing the three-dimensional plane through the first mesh representation comprises performing a random sample consensus (RANSAC) calculation on a plurality of vertices of the first group and the second group of the plurality of polygons that are on the border.

7. The method of claim 3, wherein establishing the three-dimensional plane through the first mesh representation comprises repeating a plurality of times operations comprising:
   randomly selecting at least three border vertices from a plurality of vertices of the first group and the second group of the plurality of polygons that are on the border;
   constructing a temporary plane through the at least three border vertices; and
   calculating a cumulative distance for respective ones of the plurality of vertices of the first group and the second group of the plurality of polygons that are on the border from the temporary plane; and
   establishing the three-dimensional plane through the temporary plane that has a lowest calculated cumulative distance.

8. The method of claim 3, wherein removing portions the first polygon of the first mesh representation on the side of the three-dimensional plane comprises removing the first polygon of the first mesh representation that is at least a first distance away from the three-dimensional plane in a line normal to the three-dimensional plane.

9. The method of claim 3, wherein identifying the border in the first mesh representation between the vertices of the first group of the plurality of polygons whose precision values have not been modified from the initial precision value and the vertices of the second group of the plurality of polygons whose precision values have been modified from the initial precision value comprises:
   identifying a contiguously connected series of edges through vertices of the first group and the second group of the plurality of polygons, wherein each edge of the contiguously connected series of edges comprises one vertex of a polygon of the second group whose precision value has been modified from the initial precision value and one vertex of a polygon of the first group whose precision value has not been modified from the initial precision value.

10. The method of claim 3, wherein identifying the border in the first mesh representation between the vertices of the first group of the plurality of polygons whose precision values have not been modified from the initial precision value and the vertices of the second group of the plurality of polygons whose precision values have been modified from the initial precision value comprises:

repeatedly examining each respective edge of the plurality of polygons to identify border edges, wherein the border edges comprise one vertex of a polygon of the second group whose precision value has been modified from the initial precision value and one vertex of a polygon of the first group whose precision value has not been modified from the initial precision value; and identifying a contiguously connected series of the border edges within the first mesh representation as the border.

11. An imaging system for processing images, the imaging system comprising:

a processor; and a memory coupled to the processor and storing computer readable program code that when executed by the processor causes the processor to perform operations comprising:

generating, within the memory, a first mesh representation of an object, the first mesh representation comprising a plurality of polygons, respective ones of the polygons comprising at least three vertices and at least three edges, wherein the respective ones of the plurality of polygons are each associated with a precision value that indicates an extent to which the respective ones of the plurality of polygons in the first mesh representation match a surface of the object, and wherein generating the first mesh representation of the object comprises modifying each precision value that is associated with one or more of the plurality of polygons from an initial precision value responsive to modifying the one or more of the plurality of polygons to match the surface of the object; and adjusting the first mesh representation of the object to create a second mesh representation of the object by removing, from the first mesh representation, polygons a first polygon of the plurality of polygons responsive to determining that the precision value that is associated with the first polygon has not been modified from the initial precision value.

12. The imaging system of claim 11, wherein generating the first mesh representation of the object further comprises:

setting the precision value associated with each of the plurality of polygons to the initial precision value;

receiving one or more images of a portion of the object;

identifying a plurality of points in the one or more images that correspond to the surface of the object;

associating the plurality of points with vertices of a first set of the plurality of polygons; and modifying each precision value associated with respective ones of the first set of the plurality of polygons responsive to modifying the first set of the plurality of polygons within the first mesh representation based on the plurality of points that are associated with the vertices of the first set of the plurality of polygons.

13. The imaging system of claim 11, wherein the at least three vertices of the respective ones of the plurality of polygons comprise the precision value, and wherein the respective ones of the plurality of polygons are associated with each of the precision values of the at least three vertices of the respective polygon.

14. The imaging system of claim 11, wherein removing, from the first mesh representation, polygons the first polygon of the plurality of polygons responsive to determining that the precision value that is associated with the first polygon has not been modified from the initial precision value comprises:

identifying a border in the first mesh representation between the vertices of a first group of the plurality of polygons whose precision values have not been modified from the initial precision value and the vertices of a second group of the plurality of polygons whose precision values have been modified from the initial precision value, wherein the first group of the plurality of polygons comprises the first polygon;

establishing a three-dimensional plane through the first mesh representation based on a location of the border; and removing the first polygon of the first mesh representation on a side of the three-dimensional plane.

15. The imaging system of claim 14, wherein the border comprises a contiguously connected series of edges through vertices of the first group and the second group of the plurality of polygons.

16. The imaging system of claim 14, wherein establishing the three-dimensional plane through the first mesh representation comprises repeating a plurality of times operations comprising:

randomly selecting at least three border vertices from a plurality of vertices of the first group and the second group of the plurality of polygons that are on the border;

constructing a temporary plane through the at least three border vertices; and calculating a cumulative distance for respective ones of the plurality of vertices of the first group and the second group of the plurality of polygons that are on the border from the temporary plane; and establishing the three-dimensional plane through the temporary plane that has a lowest calculated cumulative distance.

17. The imaging system of claim 14, wherein removing the first polygon of the first mesh representation on the side of the three-dimensional plane comprises removing the first polygon of the first mesh representation that is at least a first distance away from the three-dimensional plane in a line normal to the three-dimensional plane.

18. The imaging system of claim 14, wherein identifying the border in the first mesh representation between the vertices of the first group of the plurality of polygons whose precision values have not been modified from the initial precision value and the vertices of the second group of the plurality of polygons whose precision values have been modified from the initial precision value comprises:

identifying a contiguously connected series of edges through vertices of the first group and the second group of the plurality of polygons, wherein each edge of the contiguously connected series of edges comprises one vertex of a polygon of the second group whose precision value has been modified from the initial precision value and one vertex of a polygon of the first group whose precision value has not been modified from the initial precision value.

19. The imaging system of claim 14, wherein identifying the border in the first mesh representation between the vertices of the first group of the plurality of polygons whose precision values have not been modified from the initial precision value and the vertices of the second group of the plurality of polygons whose precision values have been modified from the initial precision value comprises:

repeatedly examining each respective edge of the plurality of polygons to identify border edges, wherein the border edges comprise one vertex of a polygon of the second group whose precision value has been modified from the initial precision value and one vertex of a polygon of the first group whose precision value has not been modified from the initial precision value; and identifying a contiguously connected series of the border edges within the first mesh representation as the border.

20. A computer program product for operating an imaging system, the computer program product comprising a non-transitory computer readable storage medium having computer readable program code embodied in the medium that when executed by a processor causes the processor to perform operations comprising:

generating a first mesh representation of an object, the first mesh representation comprising a plurality of polygons, respective ones of the polygons comprising at least three vertices and at least three edges, wherein the respective ones of the plurality of polygons are each associated with a precision value that indicates an extent to which the respective ones of the plurality of polygons in the first mesh representation match a surface of the object, and wherein generating the first mesh representation of the object comprises modifying each precision value that is associated with one or more of the plurality of polygons from an initial precision value responsive to modifying the one or more of the plurality of polygons to match the surface of the object; and adjusting the first mesh representation of the object to create a second mesh representation of the object by removing, from the first mesh representation, a first polygon of the plurality of polygons responsive to determining that the precision value that is associated with the first polygon has not been modified from the initial precision value.

* * * * *

UNITED STATES PATENT AND TRADEMARK OFFICE
CERTIFICATE OF CORRECTION

PATENT NO. : 11,069,134 B2  
APPLICATION NO. : 16/641363  
DATED : July 20, 2021  
INVENTOR(S) : Szasz et al.

Page 1 of 1

It is certified that error appears in the above-identified patent and that said Letters Patent is hereby corrected as shown below:

On the Title Page

(57) Abstract, Line 12:  
Please correct "front" to read -- from --

In the Claims

Column 20, Line 41, Claim 8:  
Please correct "removing portions the" to read -- removing the --

Column 21, Lines 39-40, Claim 11:  
Please correct "representation, polygons a first" to read -- representation, a first --

Column 21, Line 66, Claim 14:  
Please correct "representation, polygons the first" to read -- representation, the first --

Signed and Sealed this  
Second Day of November, 2021

Drew Hirshfeld  
*Performing the Functions and Duties of the*  
*Under Secretary of Commerce for Intellectual Property and*  
*Director of the United States Patent and Trademark Office*